US012313099B2

(12) United States Patent
Varshosaz

(10) Patent No.: US 12,313,099 B2
(45) Date of Patent: May 27, 2025

(54) HYDRAULIC SYSTEM WITH A FUNCTIONAL SAFETY FEATURE FOR DEMOLITION ROBOTS

(71) Applicant: HUSQVARNA AB, Huskvarna (SE)

(72) Inventor: Masoud Varshosaz, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/653,279

(22) Filed: May 2, 2024

(65) Prior Publication Data

US 2024/0369083 A1 Nov. 7, 2024

(30) Foreign Application Priority Data

May 4, 2023 (SE) .................................... 2350540-7

(51) Int. Cl.
*F15B 20/00* (2006.01)
*E02F 9/22* (2006.01)
(Continued)

(52) U.S. Cl.
CPC ............ *F15B 20/00* (2013.01); *E02F 9/2221* (2013.01); *E02F 9/2228* (2013.01); *E02F 9/226* (2013.01); *F15B 11/161* (2013.01); *F15B 11/165* (2013.01); *F15B 20/002* (2013.01); *F15B 20/008* (2013.01); *E02F 9/2296* (2013.01); *F15B 19/005* (2013.01);
(Continued)

(58) Field of Classification Search
CPC .... F15B 11/162; F15B 11/165; F15B 19/005; F15B 20/00; F15B 20/004; F15B 2211/6313; E02F 9/226
See application file for complete search history.

(56) References Cited

U.S. PATENT DOCUMENTS 4,222,491 A 9/1980 Geppert
10,233,951 B2 * 3/2019 Lomax ................ G05D 7/0635
(Continued)

FOREIGN PATENT DOCUMENTS

CN 114809179 A 7/2022
EP 0003939 A2 9/1979
(Continued)

OTHER PUBLICATIONS

Swedish Search Report in Swedish patent application No. 2350540-7, dated Jan. 17, 2024.

*Primary Examiner* — Michael Leslie
(74) *Attorney, Agent, or Firm* — Burr & Forman LLP

(57) ABSTRACT

A hydraulic system for controlling one or more movable members on construction equipment such as a demolition robot, where the hydraulic system is configurable in a safe mode of operation in which at least one of the movable members is intended to be stationary. The system comprises a load sensing (LS) circuit and a first hydraulic pressure sensor arranged to sense a first LS pressure in a first LS circuit part of the LS circuit. The system also comprises a control unit arranged to monitor the sensed first LS pressure, compare the first LS pressure to a predetermined acceptance criterion associated with stationarity of the one or more movable members, and trigger a safety-related action by the hydraulic system in case the first LS pressure does not satisfy the acceptance criterion even though the safe mode of operation is configured.

18 Claims, 3 Drawing Sheets

(51) Int. Cl.
*F15B 11/16* (2006.01)
*F15B 19/00* (2006.01)

(52) U.S. Cl.
CPC ............... *F15B 2211/20515* (2013.01); *F15B 2211/20546* (2013.01); *F15B 2211/6051* (2013.01); *F15B 2211/6313* (2013.01); *F15B 2211/857* (2013.01)

(56) References Cited

U.S. PATENT DOCUMENTS

| | | | |
|---|---|---|---|
| 11,067,101 B2 * | 7/2021 | Slattery | F15B 11/165 |
| 2008/0073155 A1 | 3/2008 | Bitter et al. | |
| 2010/0011757 A1 | 1/2010 | Satake et al. | |
| 2011/0315415 A1 | 12/2011 | Nishikawa et al. | |
| 2012/0037585 A1 | 2/2012 | Jene | |
| 2012/0216877 A1 | 8/2012 | Hall et al. | |
| 2015/0354167 A1 | 12/2015 | Goto et al. | |
| 2017/0121941 A1 | 5/2017 | Chioccola | |
| 2017/0284056 A1 | 10/2017 | Mizuochi et al. | |
| 2018/0320711 A1 | 11/2018 | Olsson | |
| 2019/0161944 A1 | 5/2019 | Olsson | |
| 2019/0249394 A1 | 8/2019 | Mehra et al. | |
| 2019/0264419 A1 | 8/2019 | Myers et al. | |
| 2020/0173143 A1 | 6/2020 | Kurokawa et al. | |
| 2021/0017737 A1 | 1/2021 | Schwartz et al. | |

FOREIGN PATENT DOCUMENTS

| | | | |
|---|---|---|---|
| FR | 2401407 | A1 | 3/1979 |
| FR | 2488865 | A1 | 2/1982 |
| GB | 1403046 | A | 8/1975 |
| JP | 2006336346 | A | 12/2006 |
| NL | 1025729 | C1 | 9/2005 |
| WO | 2017167434 | A1 | 10/2017 |

* cited by examiner

HYDRAULIC SYSTEM WITH A FUNCTIONAL SAFETY FEATURE FOR DEMOLITION ROBOTS

TECHNICAL FIELD

The present disclosure relates to hydraulically powered construction equipment such as remotely controlled demolition robots, excavators, and the like. There are disclosed hydraulic systems, control units, construction equipment and methods for implementing cost-efficient and reliable safety features.

BACKGROUND

Many types of construction equipment, and remote-controlled demolition machines in particular, comprise moving members that may cause hazard to nearby persons, e.g., if they suddenly move in an unexpected manner.

ISO 13849 is a safety standard published by the International Organization for Standardization (ISO) which applies to parts of machinery control systems that are assigned to providing safety functions.

There is a desire to fulfil the requirements put in place by ISO 13849 and by other similar standards.

SUMMARY

It is an objective of the present disclosure to provide hydraulic systems that improve safety in demolition robots. Some of the techniques disclosed herein seek to provide functional safety features applicable with demolition robots and other construction equipment that mitigate hazards associated with such construction equipment.

The objective is at least in part obtained by a hydraulic system for controlling one or more movable members on construction equipment, such as the arms and the tower on a demolition robot. The hydraulic system is configurable in a safe mode of operation where at least some of the movable members on the construction equipment is supposed to be stationary and where people close to the equipment are protected from unexpected movement by the one or more movable members. The system comprises a load sensing (LS) circuit connected to one or more hydraulic valves of the hydraulic system and a hydraulic pump controller is arranged to control an operation of a hydraulic pump of the hydraulic system based on a pressure feedback signal from the LS circuit. A first hydraulic pressure sensor is arranged to sense a first LS pressure in a first LS circuit part of the LS circuit, where the first LS circuit part is connected to one or more hydraulic valves arranged to operate one or more of the movable members that are supposed to be stationary when the hydraulic system is configured to be in the safe mode of operation. This first hydraulic pressure sensor may be arranged to sense pressure directly at the LS line, or somewhere else in the system associated with the LS line pressure, such as on the hydraulic pump output. A control unit of the hydraulic system is arranged to monitor the sensed first LS pressure, and to compare the first LS pressure to a predetermined acceptance criterion associated with stationarity of the one or more movable members. The control unit is also arranged to trigger a safety-related action by the hydraulic system in case the hydraulic system is configured in the safe mode of operation and the first LS pressure does not satisfy the acceptance criterion. This way a dependable yet cost-effective functional safety feature is provided where the LS circuit pressure is used to detect unexpected movement by the machine when it is configured in the safe mode of operation. Many hydraulic systems comprise LS circuits that can be used together with the techniques disclosed herein. Some of this equipment can be retrofitted with the safety systems disclosed herein, which is an advantage. The safe mode of operation can for instance be associated with stationarity of the one or more movable members, and may be associated with a safety function according to ISO13849, or some other applicable functional safety standard. Thus, adherence to safety standards can be provided in a cost-efficient manner, which is an advantage.

The hydraulic system optionally also comprises a second hydraulic pressure sensor arranged to sense a second LS pressure in a second LS circuit part of the LS circuit. The second LS circuit part is connected to one or more hydraulic valves arranged to operate at least one non-hazardous function of the construction equipment. In this case the control unit is arranged to trigger the safety-related action by the hydraulic system independently from the second LS pressure. This means that one or more non-hazardous functions can be operated while the construction equipment is configured in the safe mode of operation, such as powerpacks or other functions that draw power from the hydraulic system but do not represent hazard to persons nearby. It is an advantage that the construction equipment is not totally inactivated when the equipment is configured in the safe mode of operation.

Any of the first hydraulic pressure sensor and/or the second hydraulic pressure sensor may comprise a pressure transducer arranged to output a signal indicative of hydraulic pressure. Any of the first hydraulic pressure sensor and/or the second hydraulic pressure sensor may also comprise a pressure switch arranged to output a binary signal indicative of hydraulic pressure. A pressure switch can be used as an alternative or a complement to a pressure transducer. A combination of one or more pressure transducers and one or more pressure switches can be used for increased reliability.

According to some aspects, the acceptance criterion is just a predetermined threshold value, which may be implicitly implemented in a pressure switch, configured in hardware, or as a software parameter. The threshold value may be fixed or configurable.

The first hydraulic pressure sensor can be arranged to sense the first LS pressure on an LS line of the hydraulic system, where the predetermined threshold value is between 5 bar and 35 bar, and preferably between 10 bar and 20 bar. It is also possible to sense the first LS pressure indirectly, e.g., in connection to the hydraulic pump, where the predetermined threshold value is between 20 bar and 50 bar, and preferably between 30 bar and 40 bar. It is appreciated that the pump output pressure normally is higher than the actual pressure on the LS line.

The acceptance criterion can also be an output from an acceptance processing module of the control unit, which may implement more advanced signal processing functions, such as statistical detection tests and methods based on artificial intelligence, as will be discussed in more detail below.

According to some aspects, the control unit is arranged to receive an operator presence signal, in which case the acceptance criterion is automatically fulfilled when the operator presence signal is received. The operator presence signal may, e.g., be a signal indicative of that an operator is in control of the equipment, such as holding hands on controls or the like. Movement by the machine is then not considered unexpected. The operator presence sensor may, e.g., be a contact sensor that senses when an operator holds the control joysticks of a remote control, or a presence sensor based on vision or the like. The operator presence sensor may also be a pressure sensor that senses when an operator wears a remote control device harness.

The control unit can also be arranged to receive an override signal. In this case the acceptance criterion is considered automatically fulfilled in case the override signal is received. This allows, e.g., an operator, to consciously cause movable members to move even if the machine is configured in the safe mode of operation.

The control unit can for instance be arranged to inactivate the hydraulic pump as part of the safety-related action, thereby inactivating all hydraulically powered functions on the construction equipment and stopping all movable members. However, the control unit can in some cases also be arranged to allow operation of an electric motor operable to drive the hydraulic pump as part of the safety-related action. The control unit is optionally arranged to prevent operation by the one or more hydraulic valves arranged to operate one or more of the movable members as part of the safety-related action.

There are also disclosed herein hydraulic systems, construction equipment, processing circuits, computer programs, computer program products as well as methods associated with the advantages mentioned above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
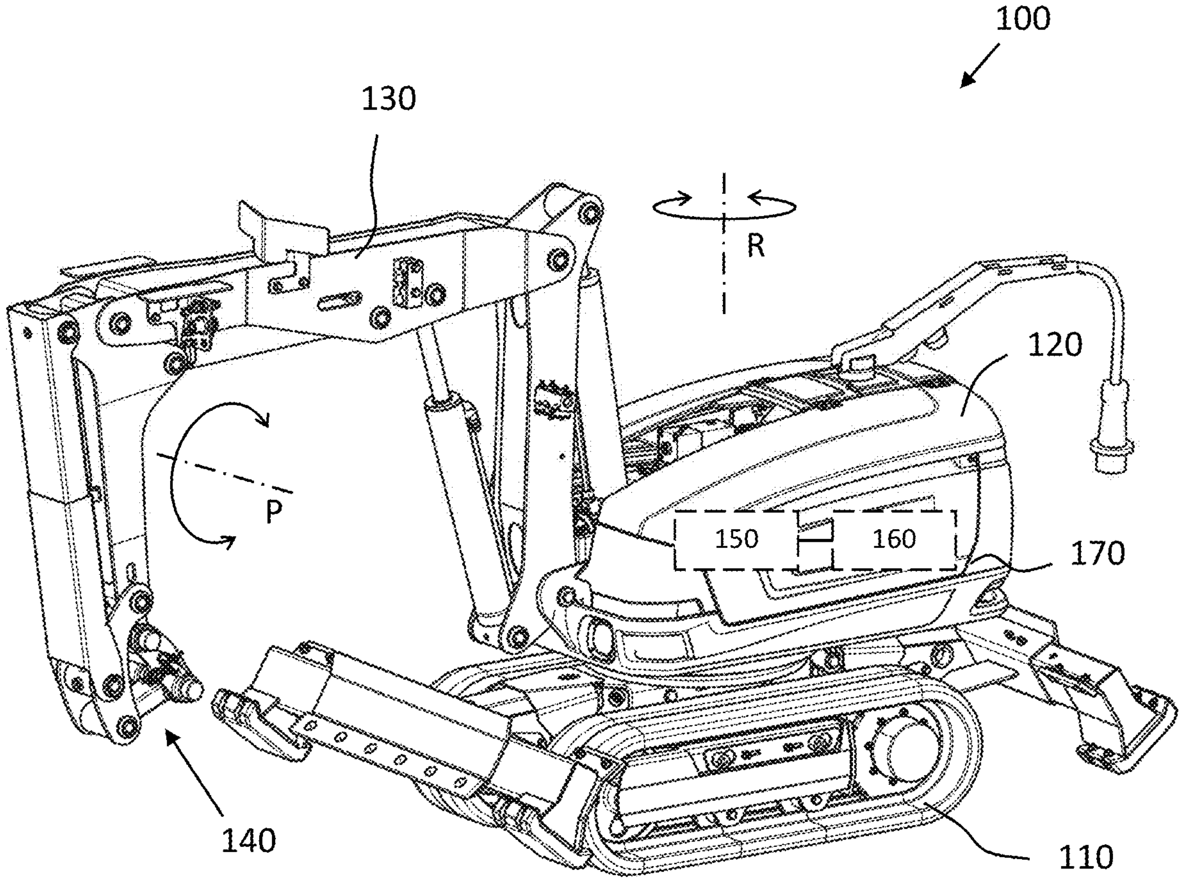
FIG. 1 shows an example demolition robot.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a remote controlled demolition robot, which is an example of more general construction equipment 100 where the techniques discussed herein can be applied. The demolition robot comprises tracks 110 for propelling the robot over ground. A body 120 is rotatably mounted on the bottom section which comprises the tracks. An arm 130, sometimes referred to as tool carrier, extends from the body 120. Various tools, such as pneumatic or hydraulic hammers, buckets, cutters, and the like can be mounted at the distal end 140 of the arm 130. These actuators are arranged to be controlled by a control unit 150 which is only schematically illustrated in FIG. 1. Most construction equipment 100 comprise actuators which are powered by a hydraulic system 160. The control unit 150 controls actuator valves and one or more hydraulic pumps of this hydraulic system 160 to trigger actions by the different actuators.

The various technical features and functions disclosed herein will be exemplified by a remote controlled demolition robot, i.e., the type of construction equipment illustrated in FIG. 1. It is, however, appreciated that the present disclosure is in no way limited to demolition robots, but can be applied generally in many types of construction equipment, such as excavators, wheel loaders, haulers, mobile cranes, and so on.

The various moving parts on the construction equipment 100 may cause hazard to persons in vicinity of the equipment. A person standing next to the machine may, e.g., be injured if the body all of a sudden starts to rotate R, or if the arm suddenly makes an unexpected pivoting motion P about one or more pivot axes. Such unexpected motion by one or more movable members of the equipment 100 may be caused accidentally by an operator of the equipment 100, but it may also be caused by malfunction in the machine, such as malfunction in one or more hydraulic valves that control the various actuators of the construction equipment 100, or a software error in the control unit 150.

ISO13849 is a safety standard published by the ISO which applies to parts of machinery control systems that are assigned to providing safety functions (called safety-related parts of a control system). The standard is one of a group of sector-specific functional safety standards that were created to tailor various system reliability and safety functions to different types of machines in different industries. Some demolition robots are required to adhere to this safety standard. Movement by the one or more movable members on the construction equipment 100 may represent a hazard to persons located nearby. Movement of the demolition robot arm, body and tracks are normally controlled by remote control device, and are considered hazardous movements that can harm the operator or bystanders. It is important that no hazardous movements occur unless the joystick is activated. As soon as the joystick on the remote control device is returned to neutral position all the hazardous movements by the demolition robot shall cease.

Figure 2:
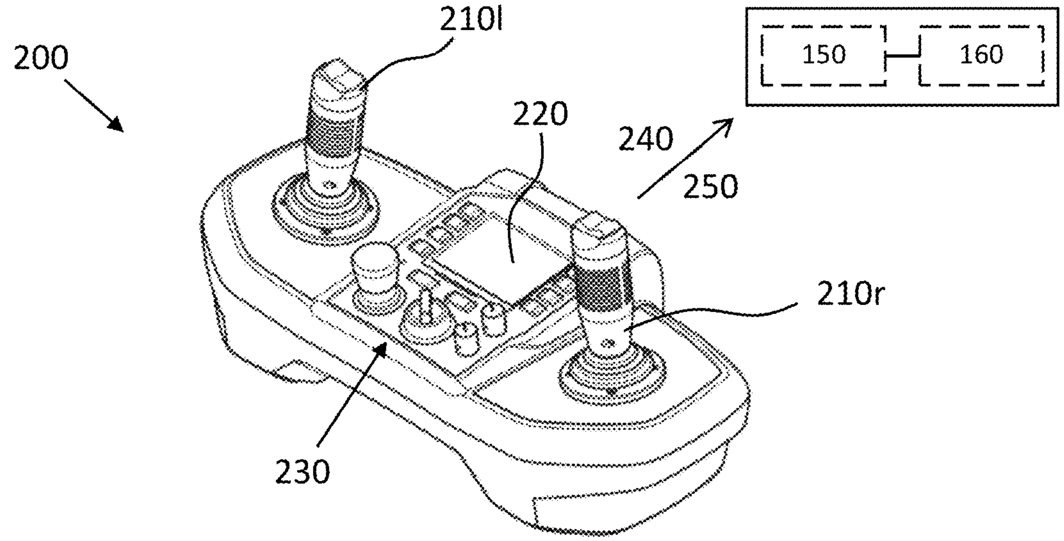
FIG. 2 shows an example portable remote control device.

The control unit 150 may as noted above be arranged for remote control, in which case the control device receives control input from a remote control device 200, exemplified in FIG. 2. The construction equipment 100 may also be arranged for autonomous operation or semi-autonomous operation, in which case the control unit 150 generates the control commands for the different actuator internally to complete a pre-determined task. A remote control device 200, an autonomous control function, and a semi-autonomous operator assistance function may suffer malfunction that may cause unexpected and undesired motion by the construction equipment 100. One of the objectives of the present disclosure is to mitigate the potential hazards resulting from such a malfunction.

The example remote control device 200 illustrated in FIG. 2 is a portable device that comprises left and right joysticks 2101, 210*r*, a display 220 for communicating information to an operator, and a plurality of buttons and levers 230 for controlling various functions on the construction equipment 100. The remote control device 200 is configured to communicate with the construction equipment 100 via wireless radio link, such as a Bluetooth link, a wireless local area network (WLAN) radio link, or a cellular connection link, such as the cellular access network links defined by the third generation partnership program (3GPP), i.e., 4G, 5G and so on.

Some control devices 200 are arranged to generate an operator presence signal 240. This signal is indicative of the presence of an operator by the control device 200. The operator presence signal 240 may comprise just a normal control input provided by an operator, perhaps with a hold function. I.e., the operator presence signal 240 is active as long as an operator has provided at least one input command over a predetermined time period, such as a time period of 3 seconds or so. The operator presence signal 240 may also be provided by a presence sensor or contact sensor, such as a capacitive sensor that detects when an operator holds the joysticks 2101, 210*r* or carries the remote control device 200 in a harness (not shown in FIG. 2). Presence sensors and contact sensors are generally known and will therefore not be discussed in more detail herein.

The remote control device 200 may also comprise a mechanism for generating an override signal 250. This override signal could for instance be related to controlling the construction equipment 100 to perform a hazardous operation.

A potential solution to mitigate hazards due to unexpected motion by the construction equipment 100 is to equip the machine with one or more motion sensors that monitor motion by the one or more movable members 110, 120, 130 of the construction equipment 100 and trigger some sort of action by the control unit 150 in response to detecting unexpected motion. Such motion sensors may comprise, e.g., displacement sensors, accelerometers, linear transducers, angle transducers, cameras and the like. A drawback of using such motion sensors is an increased system cost and complexity. The sensors themselves may also malfunction, and redundancy is therefore often required. It may also be desired to provide redundancy in the safety systems of the construction equipment 100. Thus, even if the construction equipment 100 also comprises a motion detection safety system, an alternative independent system may be desired.

A load sensing (LS) system is a hydraulic circuit that connects the various loads in the system to a hydraulic pump controller, either hydraulically or electrically. The hydraulic pump controller then ensures that the hydraulic system is fed with sufficient flow and pressure to maintain the desired operation. The maximum operating pressure of the different loads is reported to the pump's controller through a chain of non-return valves. This is known as the load sense pressure. The controller adjusts the delivery rate of the pump so that it delivers the correct hydraulic pressure and the correct delivery volume to achieve the required actuator speeds. LS systems are generally known in the technical field of hydraulics and will therefore not be discussed in more detail herein.

The hazard mitigating techniques disclosed herein rely at least in part on using the LS circuit of the hydraulic system on the construction equipment 100 to monitor motion by the machine. In case unexpected motion is detected, i.e., that the machine moves without a valid control input signal present, hazard mitigating actions are triggered by the system in order to, e.g., stop the machine. The safety systems disclosed herein can be used as stand-alone safety systems or as complements to other safety systems. The safety systems discussed herein rely on monitoring LS pressure and can therefore be retrofitted in legacy construction equipment comprising LS circuits, which many legacy machines do.

Figure 3:
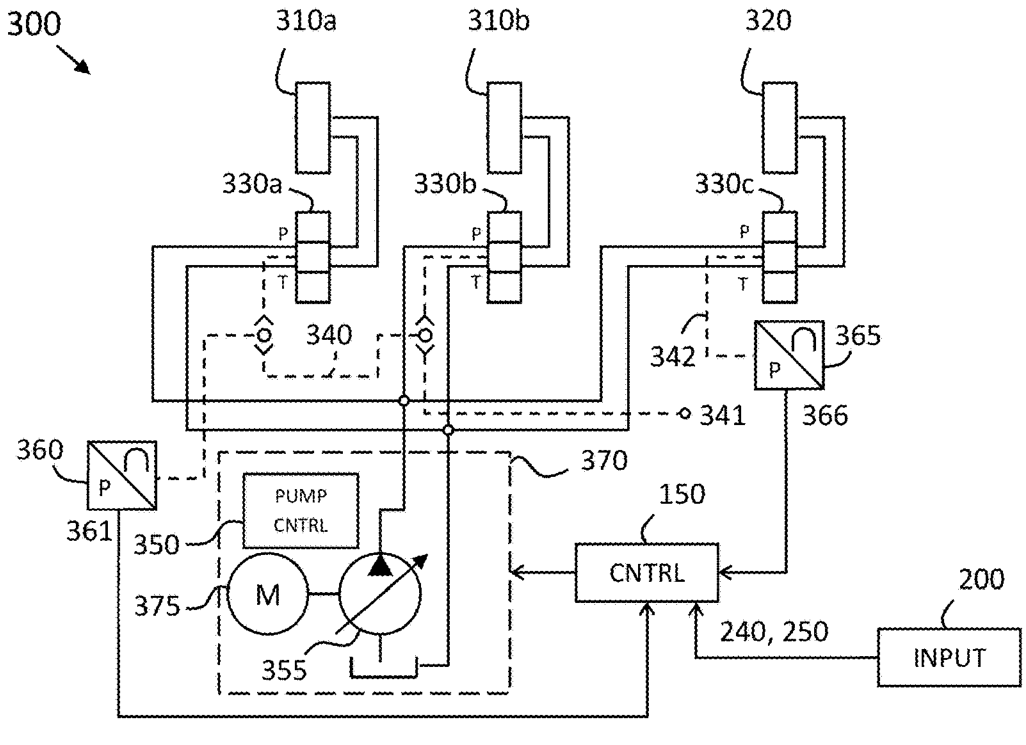
FIG. 3 illustrates an example hydraulic circuit.

FIG. 3 illustrates a hydraulic system 300 where the LS pressure signals that can cause hazardous movement in the system are monitored by a first pressure transducer 360 and the functions that do not cause hazardous movement are monitored by a second pressure transducer 365. When running, e.g., a power pack function, if the first pressure transducer 360 shows zero pressure (or below a threshold) while pressure transducer 365 shows high load pressure then the function is still safe. If the opposite happens, i.e., if the first pressure transducer indicates pressure above the threshold while the second pressure transducer does not, then the control unit immediately triggers a safety-related action such as stopping the hydraulic pump 355.

Figure 4:
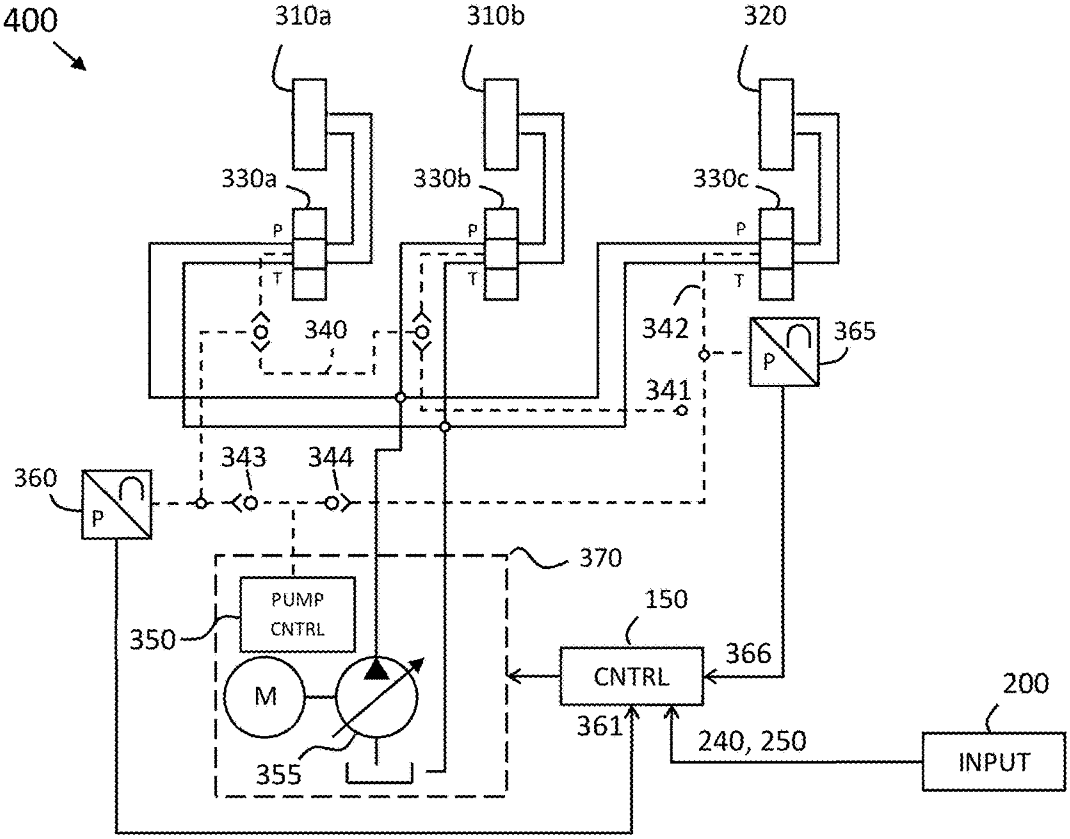
FIG. 4 illustrates another example hydraulic circuit.

FIG. 4 illustrates another example 400 for safe monitoring of LS signals in a hydraulically controlled LS pump system. In this example the LS pressure for functions that can cause hazardous movements are monitored by the first pressure transducer 360 and the function or functions that do not cause hazardous movement are monitored by the second pressure transducer 365. The LS signals are separated by check valves 343, 344 and then conducted to a pump displacement control system 350.

With general reference to the example hydraulic systems 300, 400 in FIG. 3 and in FIG. 4, there is disclosed herein a hydraulic system 170, 300, 400 for controlling one or more movable members 110, 120, 130 on construction equipment 100. The hydraulic system 170, 300, 400 is configurable in a safe mode of operation. The safe mode of operation may be associated with stationarity of the one or more movable members 110, 120, 130 and/or with a safety requirement derived according to methods outlined in applicable standards, such as ISO 13849. Generally, the construction equipment 100 is safe to be near by one or more persons when it is configured in the safe mode of operation, since then the movable members will not move unexpectedly. The hydraulic system 170, 300, 400 is normally also configurable in an active mode of operation and in an inactive mode of operation. In the active mode of operation one or more functions on the construction equipment 100 are operable from the remote control device 200 or by some autonomous or semi-autonomous function. The active mode of operation may involve several different sub-modes, such as a transport mode, a tool operation mode, and so on. The inactive mode of operation corresponds to a mode where the construction equipment 100 is turned off. The hydraulic system 170, 300, 400 comprises an LS circuit 340, 341, 342 connected to one or more hydraulic valves 330*a*, 330*b*, 330*c* of the hydraulic system. These valves control the various actuators on the construction equipment 100, such as the tracks 110, the body 120 and the arm 130. A hydraulic pump controller 350 is arranged to control the operation of a hydraulic pump 355 of the hydraulic system 170, 300, 400 based on a pressure feedback signal from the LS circuit 340, 341, 342, in a known manner. Various pump technologies can be used, such as fixed displacement pumps or variable displacement pumps.

A first hydraulic pressure sensor 360 is arranged to sense a first LS pressure in a first LS circuit part 340, 341 of the LS circuit. The first LS circuit part 340, 341 is connected to one or more hydraulic valves 330*a*, 330*b* arranged to operate one or more of the movable members 110, 120, 130. Hence, a pressure in the first LS circuit part 340, 341 of the LS circuit is indicative of hazardous movement by the construction equipment 100. It is noted that some small pressure likely is measured in the first LS circuit part 340, 341 even if no motion occurs. This small pressure is then not sufficient to overcome the friction in the system such that motion occurs by one or more of the movable members 110, 120, 130. A person sitting down on, e.g., an excavator bucket will likely also produce a pressure in the first LS circuit part 340, 341. The first LS circuit part can be the whole LS circuit or a subcircuit of the LS circuit that is associated with hazardous movement, as explained in more detail below.

The first LS circuit part normally comprises the one or more hydraulic valves arranged to operate the one or more movable members that are supposed to be stationary when the hydraulic system is configured in the safe mode of operation. Thus, an increase in pressure in the first LS circuit part is often indicative of unintended motion by construction equipment configured in the safe mode of operation.

The control unit 150 is arranged to monitor the sensed first LS pressure 361. This means that the control unit 150 samples the output from the first hydraulic pressure sensor 360 periodically or continuously. The output from the first pressure sensor 360 may be a digital message received, e.g., over a Controller Area Network (CAN), an Ethernet network, or wirelessly. The output from the first pressure sensor 360 may also be an analogue signal that is connected to the control unit 150 or to some intermediate module. The control unit 150 may be arranged to apply some type of filtering function to the sensed first LS pressure 361 as a part of the monitoring, in order to suppress measurement noise and other disturbances.

The control unit 150 is also arranged to compare the monitored first LS pressure 361 to a predetermined acceptance criterion associated with stationarity of the one or more movable members 110, 120, 130, and to trigger a safety-related action by the hydraulic system 170, 300, 400 in case the hydraulic system is configured in the safe mode of operation and the first LS pressure 361 does not satisfy the acceptance criterion. A common such safety-related action is to quickly inactivate the hydraulic pump, such that the hydraulic system loses pressure, which will halt all movable members in an efficient and reliable manner. Thus, if the construction equipment 100 or parts thereof is configured in the safe mode of operation, the control unit will trigger an action if a pressure increase is seen in the first LS circuit part 340, 341. The triggered action may, e.g., comprise inactivating the hydraulic pump 355 to stop motion by the one or more movable members and/or preventing operation by the one or more hydraulic valves 330*a*, 330*b* arranged to operate the one or more of the movable members 110, 120, 130. Other possible safety-related actions include generation of acoustic and/or visual alarm signals, transmission of notification messages to an operator and/or to a service center, and lock-out of the remote control device until some form of acknowledgement of the event has been input by the operator.

According to some aspects, the control unit 150 is arranged to allow operation of the electric motor 375 that drives the hydraulic pump 355 as part of the safety-related action. This could be possible, e.g., if the pump is connected to the motor via some form of clutch mechanism. The electric motor can then be used for other non-hazardous functions on the construction equipment 100. It is also possible to add a safety valve that dumps the hydraulic oil to tank after the pump. This way the hydraulic pressure is removed, and the electric machine can be used for other purposes.

The hydraulic system 170, 300, 400 optionally comprises a second hydraulic pressure sensor 365 arranged to sense a second LS pressure in a second LS circuit part 342 of the LS circuit 340, 341, 342. This second LS circuit part 342 is connected to one or more hydraulic valves 330*c* arranged to operate at least one non-hazardous function of the construction equipment 100. These non-hazardous functions can be, e.g., external equipment like wall saws and the like that are used remotely from the construction equipment 100, or some other form of function that does not entail any movable members or other actuators that can cause harm to a person located in vicinity of the construction equipment 100, such as charging of accumulators or a power pack function. Exactly which functions that are deemed as non-hazardous functions can vary between applications. The control unit 150 is in this case arranged to trigger the safety-related action by the hydraulic system 170, 300, 400 independently from the second LS pressure 366.

The first hydraulic pressure sensor 360 and/or the second hydraulic pressure sensor 365 may comprise respective pressure transducers arranged to output a continuous hydraulic pressure measurement signal or a discrete hydraulic pressure measurement signal, i.e., a quantized value. The first hydraulic pressure sensor 360 and/or the second hydraulic pressure sensor 365 may also comprise hydraulic pressure switches, as a complement or an alternative to the pressure transducers. The pressure switches then implicitly implement detection thresholds. One or more pressure transducers and/or one or more pressure switches can be used in the first hydraulic pressure sensor 360 and/or the second hydraulic pressure sensor 365, for redundancy purposes.

The acceptance criterion can be just a straight-forward predetermined threshold value. According to one example the first hydraulic pressure sensor 360 is arranged to sense the first LS pressure on an LS line of the hydraulic system. In this case the predetermined threshold value can be configured somewhere between 5 bar and 35 bar, and preferably between 10 bar and 20 bar. This pressure is normally enough to overcome or at least risk to overcome the friction in the system and cause movement by the one or more movable members 110, 120, 130 on the construction equipment 100. The first hydraulic pressure sensor 360 can also be arranged to sense the first LS pressure in connection to the output of the hydraulic pump 355. The pressure here is then normally the LS pressure with an added margin. The nominal pressures at this point in the system are normally a bit higher, even under stationary conditions where no movement occurs. The predetermined threshold value can in this case therefore be set somewhere between 20 bar and 50 bar, and preferably between 30 bar and 40 bar.

More advanced acceptance criteria can of course also be considered. The acceptance criterion can for instance be configured as an output from an acceptance processing module of the control unit 150. This acceptance processing module may be realized using machine learning techniques, where a machine learning structure is trained to recognize movement by the one or more movable members, and to notify the triggering function when movement has been detected. The machine learning structure can be, e.g., a neural network or a random forest structure that has been trained on data collected from LS systems of construction equipment where movement by one or more movable members occurs, and also data from construction equipment where no movement by the movable members occur. The training data may be real world data collected from pressure sensors and annotated accordingly as construction equipment performs various work tasks. The training data may also be synthetic data generated from a computer model of the hydraulic system in use, and when it is stationary. The training data may also comprise cases where no movement occurs, but where disturbances are present that cause pressure variation in the hydraulic system, and in the LS circuit in particular. The acceptance processing module can also be realized using pattern matching techniques, such as filtering techniques matched to operating conditions where the construction equipment is stationary and also to operating conditions where the construction equipment moves in one way or another. A Kalman filter can for instance be used as pattern matching, and other options are also known in the art. The Kalman filter could then for example be configured with a model of how LS pressure varies when the movable members are stationary, such as a random walk model, and the innovation process of the Kalman filter can be monitored to detect when the LS pressure rises above expected values.

The control unit 150 may, as discussed above, be arranged to receive an operator presence signal 240. The acceptance criterion is then automatically fulfilled in case the operator presence signal is received. In other words, no safety-related action will be triggered by the control unit 150 in case the systems detects that an operator is in position to control the construction equipment.

The control unit 150 may also be arranged to receive an override signal 250 as mentioned above, in which case the acceptance criterion is also automatically fulfilled.

Figure 5A:
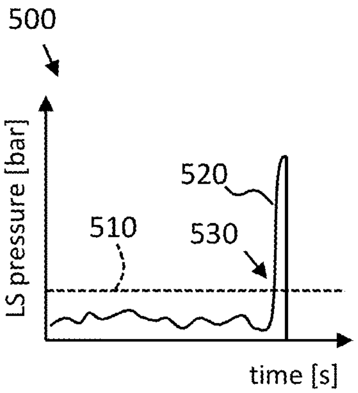
FIGS. 5A-C are flow charts that illustrate load sense pressure vs time.

FIG. 5A shows an example operation 500 of the system. A graph is illustrated showing sensed LS pressure vs time. A fixed threshold 510 on the LS pressure has been configured as acceptance criterion in this case. Any pressure in the first LS circuit part above this fixed threshold will trigger the safety-related action by the system. The monitored first LS pressure 520 is relatively low at first, and then rises sharply as an error occurs in the hydraulic system, for instance due to a software error or an error in a valve of the hydraulic system. This rise in pressure causes the threshold to be breached 530, and the control unit 150 therefore immediately suspends operation by the hydraulic system. In this case by inactivating the hydraulic pump, which is why the LS pressure drops.

Figure 5B:
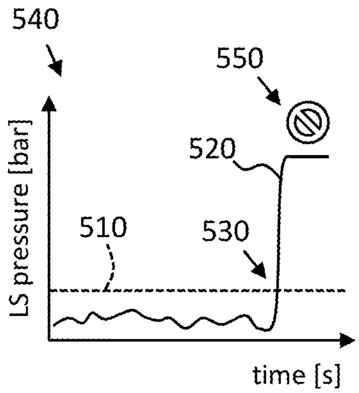

FIG. 5B shows another example operation 540. In this case the monitored first LS pressure 520 also rises sharply due to malfunction in the system, but the operation by the hydraulic valves is instead stopped 550 such that no movement can occur by the one or more movable members 110, 120, 130 of the construction equipment 100. The LS pressure remains above the threshold, but no actuator movement happens due to the safety-related action performed by the control unit 150.

Figure 5C:
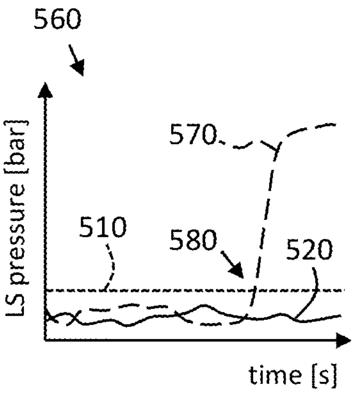

FIG. 5C shows a third example operation 560 by the hydraulic system. In this example the first LS pressure 520 stays low, but the second LS pressure 570 instead rises sharply, e.g., as some auxiliary equipment is connected to the construction equipment 100 and activated. The second LS pressure 570 breaches the predetermined acceptance criterion 580, but this breach does not cause the control unit 150 to trigger the safety-related action by the hydraulic system, since the increase in LS pressure is not associated with any hazardous functions.

Figure 6:
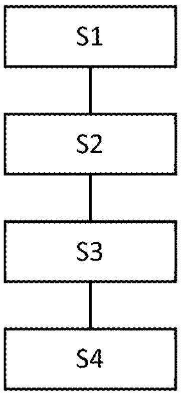
FIG. 6 is a flow chart illustrating methods.

FIG. 6 is a flow chart illustrating a computer-implemented method for controlling a hydraulic system 170, 300, 400 on construction equipment 100 comprising one or more movable members 110, 120, 130. As before, the hydraulic system 170, 300, 400 comprises an LS circuit 340, 341, 342 connected to one or more hydraulic valves 330*a*, 330*b*, 330*c* of the hydraulic system, and a hydraulic pump controller 350 is arranged to control an operation of a hydraulic pump 355 of the hydraulic system 170, 300, 400 based on a pressure feedback signal from the LS circuit 340, 341, 342. The computer implemented method comprises obtaining S1 a first LS pressure from a first hydraulic pressure sensor 360 arranged to sense pressure in a first LS circuit part 340, 341 of the LS circuit 340, 341, 342, where the first LS circuit part 340, 341 is connected to one or more hydraulic valves 330*a*, 330*b* arranged to operate one or more of the movable members 110, 120, 130, monitoring S2 the sensed first LS pressure 361, comparing S3 the first LS pressure 361 to a predetermined acceptance criterion associated with stationarity of the one or more movable members 110, 120, 130, and triggering S4 a safety-related action by the hydraulic system 170, 300, 400 in case the hydraulic system is configured in the safe mode of operation and the first LS pressure 361 does not satisfy the acceptance criterion.

Figure 7:
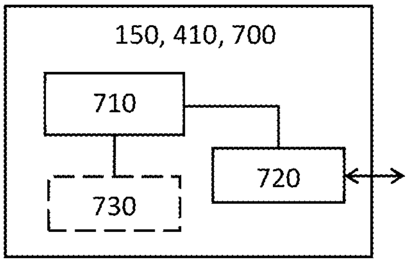
FIG. 7 schematically illustrates a control unit.

FIG. 7 schematically illustrates, in terms of a number of functional units, the general components of a control unit 700. This control unit can be used to implement, e.g., parts of the control device 150 or the pump control unit 410. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the device 700 to perform a set of operations, or steps, such as the methods discussed in connection to FIG. 5 and the discussions above. For example, the storage medium 730 may store the set of operations, and the processing circuitry 710 may be configured to retrieve the set of operations from the storage medium 730 to cause the device to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The device 150, 410, 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730.

Figure 8:
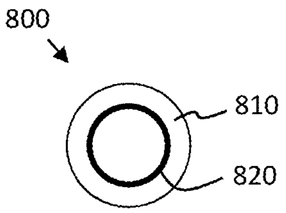
FIG. 8 schematically illustrates a computer program product.

FIG. 8 illustrates a computer readable medium 810 carrying a computer program comprising program code means

820 for performing the methods illustrated in FIG. 6, when said program product is run on a computer. The computer readable medium and the code means may together form a computer program product 800.

What is claimed is:

1. A hydraulic system for controlling one or more movable members on construction equipment, wherein the hydraulic system is configurable in a safe mode of operation associated with stationarity of at least one movable member, the system comprising:

a load sensing, LS, circuit connected to one or more hydraulic valves of the hydraulic system, wherein a hydraulic pump controller is arranged to control an operation of a hydraulic pump of the hydraulic system based on a pressure feedback signal from the LS circuit, a first hydraulic pressure sensor arranged to sense a first LS pressure in a first LS circuit part of the LS circuit, wherein the first LS circuit part is connected to the one or more hydraulic valves arranged to operate the at least one movable member associated with stationarity when the hydraulic system is configured in the safe mode of operation, and a control unit arranged to monitor the sensed first LS pressure, wherein the control unit is arranged to compare the first LS pressure to a predetermined acceptance criterion associated with stationarity of the at least one movable member, and wherein the control unit is arranged to trigger a safety-related action by the hydraulic system responsive to the hydraulic system being configured in the safe mode of operation and the first LS pressure not satisfying the acceptance criterion.

2. The hydraulic system according to claim 1, comprising a second hydraulic pressure sensor arranged to sense a second LS pressure in a second LS circuit part of the LS circuit, wherein the second LS circuit part is connected to one or more hydraulic valves arranged to operate at least one non-hazardous function of the construction equipment, wherein the control unit is arranged to trigger the safety-related action by the hydraulic system independently from the second LS pressure.

3. The hydraulic system according to claim 1, wherein the first hydraulic pressure sensor and/or the second hydraulic pressure sensor comprises a pressure transducer arranged to output a signal indicative of hydraulic pressure.

4. The hydraulic system according to claim 1, wherein the first hydraulic pressure sensor and/or the second hydraulic pressure sensor comprises a pressure switch arranged to output a binary signal indicative of hydraulic pressure.

5. The hydraulic system according to claim 1, wherein the safe mode of operation is associated with stationarity of the at least one movable member.

6. The hydraulic system according to claim 1, wherein the safe mode of operation is associated with a safety function according to ISO13849.

7. The hydraulic system according to claim 1, wherein the acceptance criterion is a predetermined threshold value.

8. The hydraulic system according to claim 7, wherein the first hydraulic pressure sensor is arranged to sense the first LS pressure on a LS line of the hydraulic system, wherein the predetermined threshold value is between 5 bar and 35 bar.

9. The hydraulic system according to claim 7, wherein the first hydraulic pressure sensor is arranged to sense the first LS pressure in connection to the hydraulic pump, wherein the predetermined threshold value is between 20 bar and 50 bar.

10. The hydraulic system according to claim 1, wherein the acceptance criterion is an output from an acceptance processing module of the control unit.

11. The hydraulic system according to claim 1, wherein the control unit is arranged to receive an operator presence signal, wherein the acceptance criterion is automatically fulfilled responsive to the operator presence signal being received.

12. The hydraulic system according to claim 1, wherein the control unit is arranged to receive an override signal, wherein the acceptance criterion is automatically fulfilled responsive to the override signal being received.

13. The hydraulic system according to claim 1, wherein the control unit is arranged to inactivate the hydraulic pump as part of the safety-related action.

14. The hydraulic system according to claim 1, wherein the control unit is arranged to allow operation of an electric motor operable to drive the hydraulic pump as part of the safety-related action.

15. The hydraulic system according to claim 1, wherein the control unit is arranged to prevent operation by the one or more hydraulic valves arranged to operate one or more of the movable members as part of the safety-related action.

16. A construction equipment comprising the hydraulics system according to claim 1.

17. A control unit arranged to control a hydraulic system on construction equipment comprising one or more movable members, wherein the control unit is configured to operate the construction equipment in a safe mode of operation, wherein the hydraulic system comprises a load sensing, LS, circuit connected to one or more hydraulic valves of the hydraulic system, wherein a hydraulic pump controller is arranged to control an operation of a hydraulic pump of the hydraulic system based on a pressure feedback signal from the LS circuit, the control unit comprising processing circuitry operable to:

obtain a first LS pressure from a first hydraulic pressure sensor arranged to sense pressure in a first LS circuit part of the LS circuit, wherein the first LS circuit part is connected to one or more hydraulic valves arranged to operate one or more of the movable members, monitor the sensed first LS pressure, compare the first LS pressure to a predetermined acceptance criterion associated with stationarity of the one or more movable members, and trigger a safety-related action by the hydraulic system in response to the hydraulic system being configured in the safe mode of operation and the first LS pressure not satisfying the acceptance criterion.

18. A computer-implemented method for controlling a hydraulic system on construction equipment comprising one or more movable members, wherein the hydraulic system is configurable in a safe mode of operation associated with stationarity of at least one of the one or more movable members, wherein the hydraulic system comprises a load sensing, LS, circuit connected to one or more hydraulic valves of the hydraulic system, wherein a hydraulic pump controller is arranged to control an operation of a hydraulic pump of the hydraulic system based on a pressure feedback signal from the LS circuit, the computer implemented method comprising:

obtaining a first LS pressure from a first hydraulic pressure sensor arranged to sense pressure in a first LS circuit part of the LS circuit, wherein the first LS circuit part is connected to one or more hydraulic valves arranged to operate one or more of the movable members, monitoring the sensed first LS pressure, comparing the first LS pressure to a predetermined acceptance criterion associated with stationarity of the one or more movable members, and triggering a safety-related action by the hydraulic system in response to the hydraulic system being configured in the safe mode of operation and the first LS pressure not satisfying the acceptance criterion.

* * * * *